United States Patent
Shan et al.

(10) Patent No.: US 7,432,987 B2
(45) Date of Patent: Oct. 7, 2008

(54) METHOD OF MOTION DETECTION FOR 3D COMB FILTER VIDEO DECODER

(75) Inventors: Pei-Ming Shan, Hsinchu (TW); Uriah Peng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 335 days.

(21) Appl. No.: 10/708,875

(22) Filed: Mar. 30, 2004

(65) Prior Publication Data

US 2005/0134744 A1 Jun. 23, 2005

(30) Foreign Application Priority Data

Dec. 22, 2003 (TW) .............................. 92136371 A

(51) Int. Cl.
- H04N 7/01 (2006.01)
- H04N 11/20 (2006.01)
- H04N 9/77 (2006.01)
- H04N 9/78 (2006.01)
- H04N 9/64 (2006.01)
- H04N 5/14 (2006.01)

(52) U.S. Cl. ..................... 348/667; 348/451; 348/663; 348/665; 348/670; 348/700; 348/701

(58) Field of Classification Search ................. 348/451, 348/663, 665, 667–670, 699–701

See application file for complete search history.

(56) References Cited

U.S. PATENT DOCUMENTS

| | | | |
|---|---|---|---|
| 5,285,266 A * | 2/1994 | Jo ............................... | 348/665 |
| 5,325,186 A * | 6/1994 | Ishizuka et al. ............. | 348/663 |
| 5,339,113 A * | 8/1994 | Iwasaki ....................... | 348/604 |
| 5,365,281 A * | 11/1994 | Ko et al. ...................... | 348/700 |
| 5,430,500 A * | 7/1995 | Hoshino et al. ............. | 348/701 |
| 5,473,389 A * | 12/1995 | Eto et al. ..................... | 348/669 |
| 5,502,509 A * | 3/1996 | Kurashita et al. ........... | 348/669 |
| 5,585,861 A * | 12/1996 | Taniguchi et al. ........... | 348/669 |
| 5,603,013 A * | 2/1997 | Ohara ......................... | 703/23 |
| 5,703,968 A * | 12/1997 | Kuwahara et al. ........... | 382/269 |
| 5,786,872 A * | 7/1998 | Miyazaki et al. ............ | 348/669 |
| 5,909,255 A * | 6/1999 | Hatano ........................ | 348/663 |
| 5,929,938 A * | 7/1999 | Cho ............................ | 348/665 |
| 5,990,978 A * | 11/1999 | Kim et al. .................... | 348/663 |
| 6,061,100 A * | 5/2000 | Ward et al. .................. | 348/607 |
| 6,122,767 A * | 9/2000 | Ohara ......................... | 714/822 |
| 6,239,842 B1 * | 5/2001 | Segman ....................... | 348/448 |
| 6,262,773 B1 * | 7/2001 | Westerman .................. | 348/448 |
| 6,278,495 B1 * | 8/2001 | Lowe et al. .................. | 348/665 |
| 6,300,985 B1 * | 10/2001 | Lowe et al. .................. | 348/665 |
| 6,380,983 B1 * | 4/2002 | Miyazaki et al. ............ | 348/554 |

(Continued)

*Primary Examiner*—Brian P. Yenke
(74) *Attorney, Agent, or Firm*—Jianq Chyun IP Office

(57) ABSTRACT

A method of motion detection for a 3D comb filter video decoder is disclosed. In this method, a plurality of sampled data $F_m P_{x,y}$ is obtained and temporarily stored after a composite video signal is sampled, wherein $F_m P_{x,y}$ represents a sampled data of the $y^{th}$ pixel on the $x^{th}$ line of the $m^{th}$ frame inside the composite video signal, and m, x, y are positive integers greater than or equal to 0. Then, $F_{m+1} P_{x,y}$, $F_m P_{x,y}$, $F_{m-1} P_{x,y}$, and $F_{m-2} P_{x,y}$ are used to determine a motion/still status of the composite video signal. Since the present invention performs the motion detection according to the composite video signal whose Y/C has not been separated yet, the present invention can accurately determine the motion level.

10 Claims, 7 Drawing Sheets

U.S. PATENT DOCUMENTS

| | | | |
|---|---|---|---|
| 6,400,762 B2 * | 6/2002 | Takeshima | 375/240.01 |
| 6,414,719 B1 * | 7/2002 | Parikh | 348/448 |
| 6,667,776 B1 * | 12/2003 | Sumiyoshi et al. | 348/669 |
| 6,674,488 B1 * | 1/2004 | Satoh | 348/663 |
| 6,693,676 B2 * | 2/2004 | Yamaguchi et al. | 348/452 |
| 6,738,097 B2 * | 5/2004 | Satoh | 348/663 |
| 6,774,954 B1 * | 8/2004 | Lee | 348/665 |
| 6,795,126 B1 * | 9/2004 | Lee | 348/663 |
| 6,822,691 B1 * | 11/2004 | Kim et al. | 348/452 |
| 6,914,638 B2 * | 7/2005 | Tsui | 348/663 |
| 7,046,299 B1 * | 5/2006 | Lowe | 348/500 |

* cited by examiner

METHOD OF MOTION DETECTION FOR 3D COMB FILTER VIDEO DECODER

CROSS REFERENCE TO RELATED APPLICATIONS

This application claims the priority benefit of Taiwan application serial no. 92136371, filed on Dec. 22, 2003.

BACKGROUND OF INVENTION

1. Field of the Invention

The present invention relates to a method of motion detection, and more particularly, to a method of motion detection for a NTSC or PAL 3D comb filter video decoder.

2. Description of the Related Art

In today's modern life, it is common that people can enjoy receiving information in the comfort of home without going outside. One example is the television (TV) system, in which a TV station can transmit pictures such as the beautiful landscapes, news, dramas, movies, talk shows and other entertainment shows, which can be watched in the comfort of home. The other example is the community surveillance system, which allows monitoring the situation via displaying pictures taken by the surveillance camera on the display screen. The video systems mentioned above support different functions and objects, however, a video signal is required to be sent from a sender to a receiver in all cases.

A color is composed of the R, G, B tricolor. Therefore, in order to transmit a video picture, the sender has to convert the R, G, B color data to an electric signal before sending it out. However, since the transmission bandwidth is limited, in order to overcome transmission bandwidth limitation, a special method is used to convert the R, G, B color data into a luma and chroma data. For example, Y (luma), U (chroma), V (chroma) data is one of the examples of the luma and chroma data converted from the R, G, B data. The relationship of the R, G, B data and the Y, U, V data is $Y=0.299R+0.587G+0.114B$; $U=0.493 (B-Y)$; and $V=0.877 (R Y)$. Wherein, the weighting of the R, G, B in Y equation represents the perceptive levels of human eyes to the R, G, B tricolor. U and V represent B (blue) and R (red) in which the luma has been removed from it, respectively. As to the white light (i.e. $R=G=B$), its U and V are all equal to 0 (it means there is no chromatism in the white light).

When the signal is transmitted, a chroma data has to be modulated on a subcarrier first and then mixed up with a luma data. For example, in the NTSC standard defined by the National Television Standards Committee (NTSC), before the signal is transmitted, the Y, U, V data is modulated to a composite video signal as $Y+U*\sin(\omega t)+V*\cos(\omega t)$. Wherein, $\omega=2\pi*Fsc$, and Fsc is the frequency of a subcarrier signal. In addition, a Phase Alternating Line (PAL) standard is also valid as a European country TV standard, wherein the Y, U, V data is modulated with an inverse-phase line-by-line method. When the PAL standard is used to modulate the Y, U, V data in each line of the frame, the modulation method of $Y+U*\sin(\omega t)+V*\cos(\omega t)$ or $Y+U*\sin(\omega t)-V*\cos(\omega t)$ is interleave used. In other words, if the Y, U, V data is modulated with $Y+U*\sin(\omega t)+V*\cos(\omega t)$ in one line, the Y, U, V data should be modulated with $Y+U*\sin(\omega t)-V*\cos(\omega t)$ in next line.

The data in the composite video signal is sampled after the receiver receives the composite video signal. It is common that the comb filter samples the composite video signal with a frequency which is four times the Fsc, thus each line in NTSC has 910 sample points, whereas each line in PAL has 1135 sample points. Each frame in NTSC has 525 lines, thus there are total 910*525=477750 sample points. In addition, each frame in PAL has 625 lines, thus there are total 1135*625+4=709379 sample points. Since the sample points of an entire frame is not multiple of the lines, different level of the phase error is occurred on different sampling points.

In general, the most difficult part of the TV decoder technique is the Y/C separation. The effect of the Y/C separation significantly impacts the decoding quality of the AV decoder. Therefore, in the current application environment, which requires high quality image, a 3D comb filter is commonly used to perform the Y/C separation.

Before the 3D comb filtering is performed on the composite video signal, the composite video signal has to be sampled every 90 degrees of the phase angle first. As to the NTSC standard, $Y+V, Y+U, Y-V, Y-U$ are obtained when the sample phase is equal to 0, $0.5\pi$, $\pi$, and $1.5\pi$, respectively. FIG. 1 is a schematic diagram illustrating the sampling result (partial) of the frames in the NTSC system. Referring to FIG. 1, the Y-axis in the diagram represents a position x of the line in the frame, and the X-axis represents a position y of the pixel in the line. If two sampling data respectively belong to their neighboring frames and are on the same corresponding position, since three are 477750 (a number of multiple of 4 adding a remainder 2) sample points in between, the phase difference between these two positions would be exactly 180 degrees. FIG. 1 also can be used to describe the sampling relationship of the neighboring frames mentioned above if the Y-axis in the diagram is modified as the sequence number m of the frame (meanwhile, the Y-axis is the time axis).

Compared to the NTSC standard, the PAL standard is a little more complicated, in that, there are 709379 (a number of multiple of 4 adding a remainder 3) sample points in a frame. Although they are all on the same corresponding position, if the sampled data of the previous frame is $Y+U$, the sampled data of the next frame is $Y+V$, and the sampled data of another next frame is $Y-U$. FIG. 2A is a schematic diagram illustrating the sampling result (partial) for the frames in the PAL system when the sample phase is equal to 0, $0.5\pi$, $\pi$, and $1.5\pi$, respectively. Referring to FIG. 2A, the Y-axis in the diagram represents a position x of the line in the frame, and the X-axis represents a position y of the pixel in the line (wherein, the Y-axis also represents the relationship of the contiguous frames). However, such arrangement makes it difficult to implement the comb filtering, thus it is common to shift the sample phase 45 degrees. In other words, the data is sampled when the sample phase is equal to $0.25\pi$, $0.75\pi$, $1.25\pi$, and $1.75\pi$, respectively. FIG. 2B is a schematic diagram illustrating the sampling result (partial) for the frames in the PAL system when the sample phase is equal to $0.25\pi$, $0.75\pi$, $1.25\pi$, and $1.75\pi$, respectively. Referring to FIG. 2B, the Y-axis in the diagram represents a position x of the line in the frame, and the X-axis represents a position y of the pixel in the line (wherein, Y-axis also represents the relationship of the contiguous frames). Wherein, $A=0.707 (U+V)$, and $B=0.707 (U-V)$.

During processing the PAL signal, since there are 1135*625+4 points in the PAL frame, which is not multiple of 1135, nor multiple of 625. Therefore, an error occurs when the sampling is performed based on the fact that each line has 1135 points, and 4 pixels of error are formed after the errors have been accumulated for 625 lines. Normally, these 4 pixels of error are evenly distributed on 625 lines, thus each line is shifted 4/625 pixel. Therefore, it is common that the phase of each sample point is not exactly $0.25\pi$, $0.75\pi$, $1.25\pi$, and $1.75\pi$, instead a small phase angle difference is exists. The modulation method for the PAL system is $Y+U*\sin(\omega t)+$ V*cos(ωt) or Y+U*sin(ωt)−V*cos(ωt)A. It is assumed that ωt is (0.25π+δ), (0.75π+δ), (1.25π+δ), and (1.75π+δ) (where δ is a phase angle difference), then sin(0.25π+δ)=sin(0.25π) cos(δ)+cos(0.25π)sin(δ)=0.707(cosδ+sinδ)=0.707(1+$e_0$); cos(0.25π+δ)=cos(0.25π)cos(δ)−sin(0.25π)sin(δ)=0.707 (cosδ−sinδ)=0.707(1−$e_0$); thus Y+U*sin(ωt)+V*cos(ωt)= Y+0.707(U+V+$e_0$(U−V)=Y+A+$e_B$, and the rest of the angles can be deduced by analogy. Finally, the physical sampling values as shown in FIG. 2C are obtained. Wherein, the phase difference $e_A$=$e_0$A, and the phase difference $e_B$=$e_0$B. FIG. 2C is a schematic diagram illustrating the physical sampling result (partial) for the frames in the PAL system when the sample phase is equal to 0.25π+δ, 0.75π+δ, 1.25π+δ, and 1.75π+δ, respectively. Referring to FIG. 2C, the Y-axis in the diagram represents a position x of the line in the frame, and the X-axis represents a position y of the pixel in the line (wherein, the Y-axis also represents the relationship of the contiguous frames).

FIG. 3A is a schematic block diagram of a conventional 3D comb filter. Referring to FIG. 3A, a 3D comb filter generally comprises an inter-frame Y/C separator 310, an intra-field Y/C separator (i.e. the so-called 2D comb filter) 320, a motion detector 330, a memory 340, and a mixer 350. The composite video signal 301 is a sampled signal, and $F_{m+1}$ indicates that the composite video signal 301 is a composite video signal of the $(m+1)^{th}$ frame. The memory 340 temporarily stores the composite video signal 301, and provides a composite video signal 302 and a composite video signal 305 (wherein, $F_m$ represents the composite video signal of the $m^{th}$ frame). The intra-field Y/C separator 320 receives the composite video signal 305 and performs the Y/C separation according to the space correlation among the pixels in the frame $F_m$, and finally outputs a separated video signal 321.

In general, the Y/C separation of a motion video signal is performed by the intra-field Y/C separator 320. However, the intra-field Y/C separator is disadvantageous in that an edge blur is generated when processing a still video signal. In order to improve the picture quality, the still video signal is commonly processed by the inter-frame Y/C separator 310. A conventional inter-frame Y/C separator 310 receives the composite video signals of the frame $F_{m+1}$ and frame $F_m$ simultaneously, and performs the Y/C separation according to the time correlation among the pixels each corresponding to the contiguous frame $F_{m+1}$ and frame $F_m$, respectively, so as to output a separated video signal 311. The motion detector 330 is responsible for determining whether the composite video signal 301 is a motion video signal or a still video signal. A conventional motion detector 330 first receives the composite video signal 301 and a luma data 321a (which is provided by the separated video signal 321), then uses the luma data 321a and the composite video signal 301 to calculate a luma difference and a chroma difference for the two frames, then determines a motion/still status of the pixel according to the luma difference and the chroma difference, and finally outputs a selection signal 331. The mixer 350 selects the separated video signal 321 or the separated video signal 311, or mixed them up with a predetermined ratio according to the selection signal 331, and outputs a separated video signal 351.

The motion detector 330 is a key component of the 3D comb filter. If the motion status is falsely determined as the still status, an obvious error picture is formed accordingly. If it is too conservative such that most of the cases are determined as the motion status, the 3D effect is significantly impacted. The method of motion detection in the prior art calculates the Y/C (luma/chroma) value of the previous frame and the current frame, respectively, and compares the difference between these two values. FIG. 3B is a schematic block diagram of a motion detector of a conventional 3D comb filter. Referring to FIG. 3B, as to the NTSC standard, an approximate luma data 332 is obtained after the composite video signal 301 has passed through a low pass filter (LPF) 360, and a luma data 333 of the previous frame is obtained after the approximate luma data 332 has been delayed by a frame buffer 391 for a frame time. The luma data 332 of the current frame is then compared with the luma data 333 of the previous frame so as to obtain a luma difference 334. In addition, a chroma data 336 is obtained after the composite video signal 301 has passed through a band pass filter (BPF) 370 and has been subtracted from the luma data 321a (which is provided from the separated video signal 321 calculated by the intra-field Y/C separator 320). Then, the chroma data 338 of the previous two frames is obtained after the chroma data 336 has been delayed by the frame buffers 392, 393 for two frames time. A chroma difference 339 is obtained after the chroma data 336 of the current frame is subtracted from the chroma data 338 of the previous two frames. A detecting circuit 380 calculates a motion factor by selecting a number which is bigger between the luma difference 334 and the chroma difference 339.

As to the PAL standard, the method of motion detection in the prior art is similar to the one in the NTSC standard except for the frame buffers 392, 393 delay the chroma data 336 for 4 frames time, and therefore detail description of other similar elements is omitted herein.

It is common to compare the motion factor with a predetermined threshold in determining the motion/still status of the composite video signal 301. If the motion factor is obviously greater than the threshold, it is determined as in the motion status, and meanwhile the detecting circuit 380 outputs a selection signal 331 to select the intra-field Y/C separator 320. If the motion factor is obviously smaller than the threshold, it is determined as in still status, and meanwhile the detecting circuit 380 outputs a selection signal 331 to select the inter-frame Y/C separator 310 for improving the picture quality. If the motion factor is near to the threshold, it is difficult to roughly determine whether it is in motion status or in still status. Therefore, it is common to mix up the Y/C data, which are obtained from the calculation of the intra-field Y/C separator 320 and the inter-frame Y/C separator 310 respectively, with an appropriate ratio for processing this kind of grey-area case. Therefore, the greater the non-convergence of the method for calculating the motion factor, the greater the range of the grey-area, the less the advantages of the 3D comb filter.

The method of motion detection of the prior art, a Y/C data is first calculated using the intra-field Y/C separation method and compares it with a Y/C data of the previous frame, and then determines a final Y/C data which is output according to the comparison result. Therefore, a chicken-egg problem occurs. If the intra-field Y/C separation can accurately separate the Y/C data in the beginning stage, the inter-frame Y/C separation is not required, and there is no need to calculate the motion factor. However, if the Y/C data calculated in the beginning stage is not correct, the motion factor, which is calculated based on the incorrect Y/C data is not correct, either. Therefore, its correctness is greatly impacted if the final Y/C data is determined based on an incorrect motion factor.

SUMMARY OF INVENTION

Therefore, the present invention provides a method of motion detection for a 3D comb filter video decoder, in which the motion detection is based on an original (whose Y/C has not been separated yet) composite video signal.

The method comprises following steps. At first, a plurality of sampled data $F_m P_{x,y}$ is obtained and temporarily stored after a composite video signal is sampled, wherein $F_m P_{x,y}$ represents a sampled data of the $y^{th}$ pixel on the $x^{th}$ line of the $m^{th}$ frame inside the composite video signal, and m, x, y are positive integers greater than or equal to 0. Then, $F_{m+1} P_{x,y}$, $F_m P_{x,y}$, $F_{m-1} P_{x,y}$, and $F_{m-2} P_{x,y}$ are used to determine a motion/still status of the composite video signal.

According to an embodiment of the present invention, the step of determining the motion/still status of the composite video signal mentioned above further comprises following steps. At first, $F_{m+1} P_{x,y}$, $F_m P_{x,y}$, $F_{m-1} P_{x,y}$, and $F_{m-2} P_{x,y}$ are used to calculate and obtain a plurality of max differences $MD_{x,y}$, wherein $MD_{x,y}$ represents a max difference of a $y^{th}$ pixel on the $x^{th}$ line. Then, an average is obtained by averaging 4 max differences of the contiguous pixels randomly selected, so as to obtain a plurality of motion factors $MF_{x,y}$, wherein $MF_{x,y}$ represents a motion factor of the $y^{th}$ pixel on the $x^{th}$ line. Finally, the $MF_{x,y}$ is detected to determine the motion/still status of the $y^{th}$ pixel on the $x^{th}$ line in the composite video signal.

According to an embodiment of the present invention, when it is determined that the composite video signal is a signal for the NTSC system, the step of sampling the composite video signal uses a frequency which is 4 times the subcarrier frequency in the composite video signal to sample the signal, and the signal is sampled when the subcarrier phase is equal to 0, $0.5\pi$, $\pi$, and $1.5\pi$. Meanwhile, $MD_{x,y}$ is calculated based on the equation: $MD_{x,y} = \text{Max}\{|F_m P_{x,y} - F_{m-2} P_{x,y}|, |F_{m+1} P_{x,y} - F_{m-1} P_{x,y}|\}$.

According to an embodiment of the present invention, when it is determined that the composite video signal is a signal for the PAL system, the step of sampling the composite video signal uses a frequency which is 4 times the subcarrier frequency in the composite video signal to sample the signal, and the signal is sampled when the subcarrier phase is equal to $0.25\pi$, $0.75\pi$, $1.25\pi$, and $1.75\pi$. Meanwhile, the step of calculating and obtaining the $MD_{x,y}$ comprises following steps. At first, a plurality of luma differences $LD_{x,y}$ is calculated and obtained, wherein $LD_{x,y}$ represent a luma difference of the $y^{th}$ pixel on the $x^{th}$ line, and it is calculated based on the equation: $LD_{x,y} = |F_m P_{x,y} + F_{m-2} P_{x,y} - F_{m+1} P_{x,y} - F_{m-1} P_{x,y}|$. Then, a plurality of intermediate differences $IMD_{x,y}$ is calculated and obtained, wherein $IMD_{x,y}$ represents an intermediate difference of the $y^{th}$ pixel on the $x^{th}$ line, and it is calculated based on the equation: $IMD_{i,2j-1} = \text{Max}\{|F_{m+1} P_{i,2j-1} - F_{m-2} P_{i,2j-1}|, |F_m P_{i,2j-1} - F_{m-1} P_{i,2j-1}|\}$; $IMD_{i,2j} = \text{Max}\{|F_{m+1} P_{i,2j} - F_m P_{i,2j}|, |F_{m-1} P_{i,2j} - F_{m-2} P_{i,2j}|\}$. Afterwards, the $MD_{x,y}$ is calculated and obtained, it is calculated based on the equation: $MD_{x,y} = a*IMD_{x,y} + (1-a)*LD_{x,y}$, wherein a is a real number greater than 0 and less than 1, and i, j are positive integers.

According to an embodiment of the present invention, the step of obtaining $MF_{x,y}$ comprises following steps. At first, an average is obtained by averaging 4 max differences (which comprises $MF_{x,y}$) of the contiguous pixels randomly selected, so as to obtain a plurality of the averages of max difference $AMD_{x,h}$, wherein $AMD_{x,h}$ represents an average of max difference of the $h^{th}$ pixel on the $x^{th}$ line, and h is a positive integer. $AMD_{x,h}$ is calculated based on the equation: $AMD_{x,h} = (MD_{x,h} + MD_{x,h+1} + MD_{x,h+2} + MD_{x,h+3})/4$. Then, a minimum is selected from the averages of max difference as a motion factor $MF_{x,y}$, wherein $MF_{x,y}$ represents a motion factor of the $y^{th}$ pixel on the $x^{th}$ line. $MF_{x,y}$ is represented by the equation such as $MF_{x,y} = \text{Min}(AMD_{x,y}, AMD_{x,y-3}, AMD_{x,y-6}, AMD_{x,y+3})$, or $MF_{x,y} = \text{Min}(AMD_{x,y}, AMD_{x,y-3})$, or other equation which complies to the spirit of the present invention.

According to an embodiment of the present invention, the step of detecting $MF_{x,y}$ for determining the motion/static status of the $y^{th}$ pixel on the $x^{th}$ line in the composite video signal further comprises following steps. At first, a threshold is provided. Then, $MF_{x,y}$ is compared with the threshold. When $MF_{x,y}$ is greater than the threshold, it is determined that the $y^{th}$ pixel on the $x^{th}$ line in the composite video signal is in the motion status, otherwise, it is in the still status. Wherein, the motion factor $MF_{x,y}$ is the motion factor of the $m^{th}$ frame.

Since the present invention directly performs the motion detection based on a composite video signal whose Y/C has not been separated yet, and therefore, it can accurately determine the motion level, and exhibit the advantage of the 3D comb filter video decoder to its maximum extend.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 4:
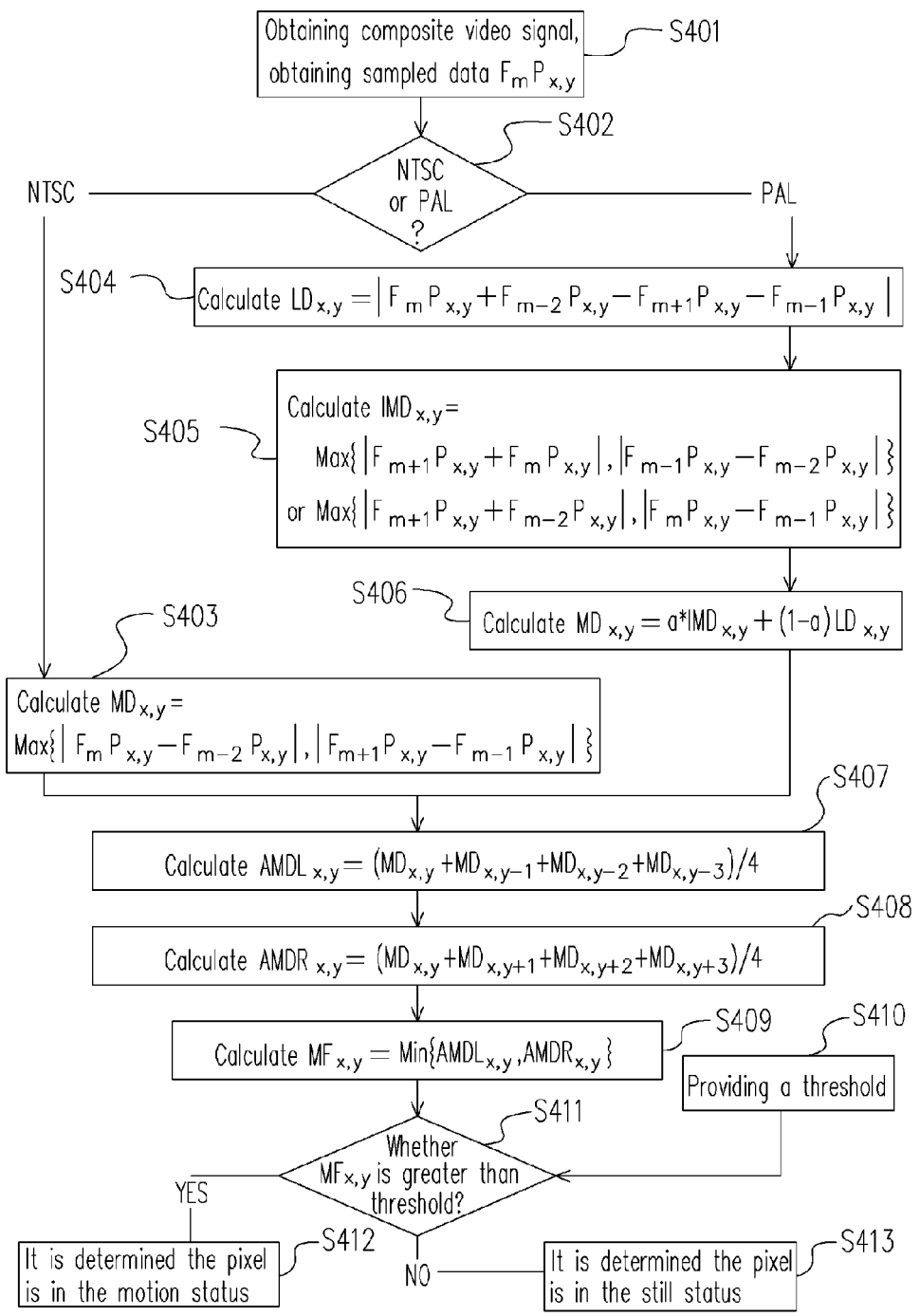
FIG. 4 is a flow chart illustrating a method of motion detection for a 3D comb filter video decoder according to an embodiment of the present invention.

FIG. 4 is a flow chart illustrating a method of motion detection for a 3D comb filter video decoder according to an embodiment of the present invention. The method of motion detection for a 3D comb filter video decoder is described with reference to FIG. 1, FIG. 2C and FIG. 4. In step S401, a sampled data $F_m P_{x,y}$ is obtained after the composite video signal has been sampled, wherein $F_m P_{x,y}$ represents a sampled data of $y^{th}$ pixel on the $x^{th}$ line of the $m^{th}$ frame in the composite video signal, and m, x, y are the positive integers greater than or equal to 0. In the present embodiment, if it is operated under the NTSC system, in step S401, a frequency which is 4 times the subcarrier frequency in the composite video signal is used to sample the signal, and the signal is sampled when the subcarrier phase is equal to 0, $0.5\pi$, $\pi$, and $1.5\pi$. If it is operated under the PAL system, in step S401, a frequency which is 4 times the subcarrier frequency in the composite video signal is used to sample the signal, and the signal is sampled when the subcarrier phase is equal to $0.25\pi$, $0.75\pi$, $1.25\pi$, and $1.75\pi$.

In step S402, either the NTSC system or the PAL system is selected. If the NTSC system is selected, the process moves to step S403, otherwise, the process moves to step S404.

Figure 1:
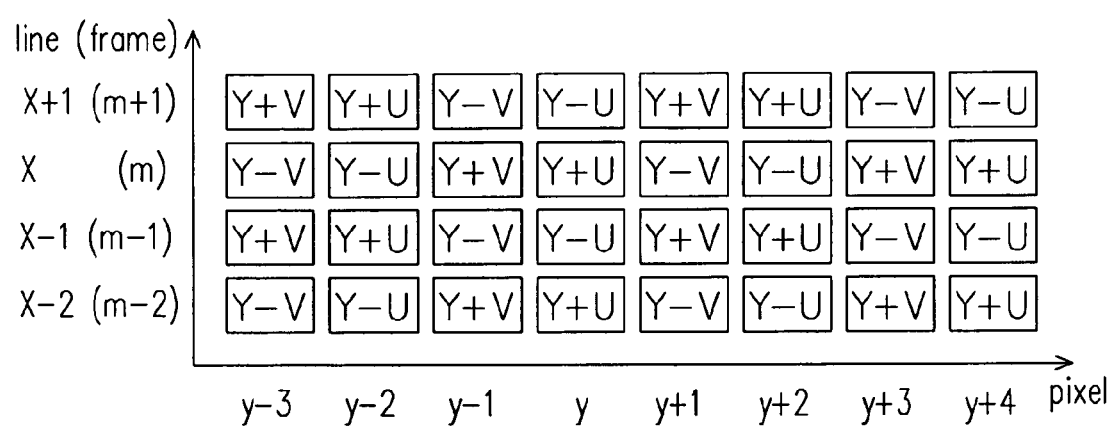
FIG. 1 is a schematic diagram illustrating the sampling result (partial) of the frames in the NTSC system.

In step S403, a max difference $MD_{x,y}$ is calculated (where $MD_{x,y}$ represents a max difference of the $y^{th}$ pixel on the $x^{th}$ line), and it is calculated based on the equation: $MD_{x,y}=Max\{|F_m P_{x,y}-F_{m-2}P_{x,y}|, |F_{m+1}P_{x,y}-F_{m-1}P_{x,y}|\}$. In the present embodiment, $MD_{x,y}$ is a max difference of the $m^{th}$ frame. The NTSC system in FIG. 1 is exemplified herein for explanation (wherein, the Y-axis represents the frames, and the X-axis represents the pixels). In the diagram, both values of the $y^{th}$ pixel on the $m^{th}$ frame and the $(m-2)^{th}$ frame are Y+U, and both values of the $y^{th}$ pixel on the $(m-1)^{th}$ frame and the $(m+1)^{th}$ frame are Y−U. In addition, an absolute value is obtained by taking an absolute value of the result of subtracting Y+U from Y+U, and the other absolute value is obtained by taking an absolute value of the result of subtracting Y−U from Y−U, and finally $MD_{x,y}$ is obtained by selecting a number which is bigger than these two absolute values.

Figure 2A:
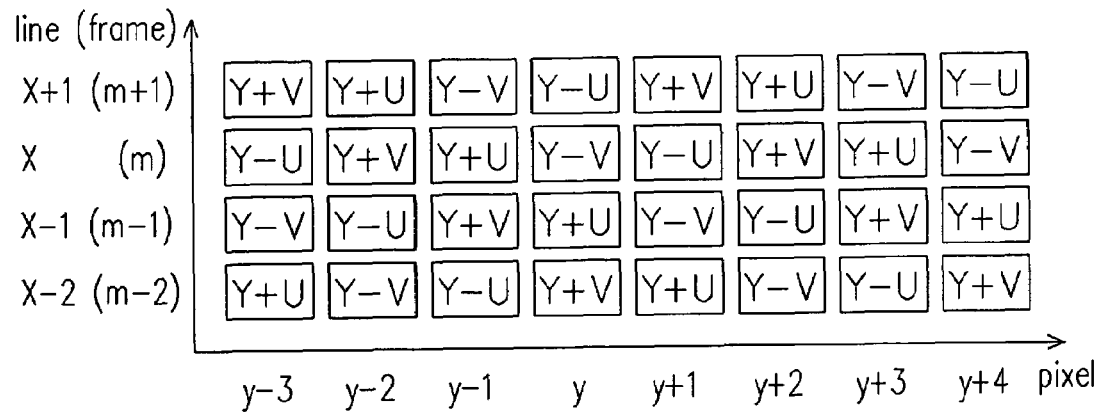
FIG. 2A is a schematic diagram illustrating the sampling result (partial) for the frames in the PAL system when the sample phase is equal to 0, $0.5\pi$, $\pi$, and $1.5\pi$, respectively.
Figure 2B:
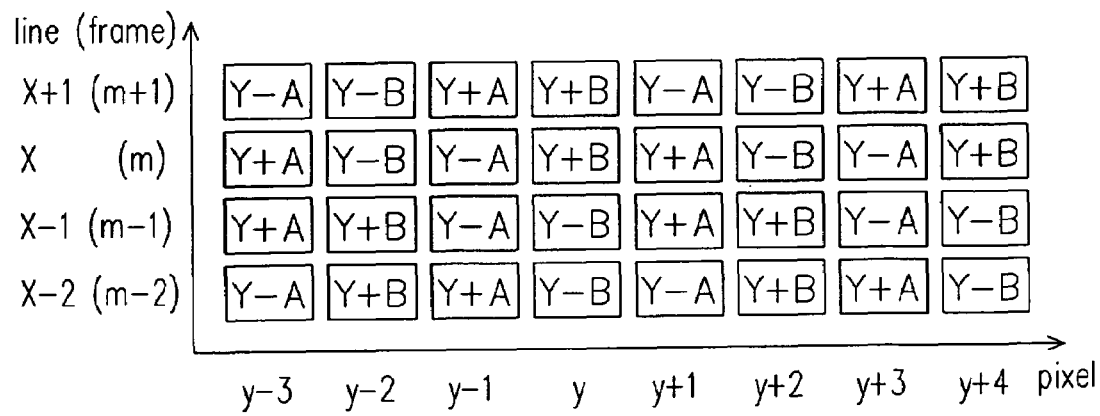
FIG. 2B is a schematic diagram illustrating the sampling result (partial) for the frames in the PAL system when the sample phase is equal to $0.25\pi$, $0.75\pi$, $1.25\pi$, and $1.75\pi$, respectively.
Figure 2C:
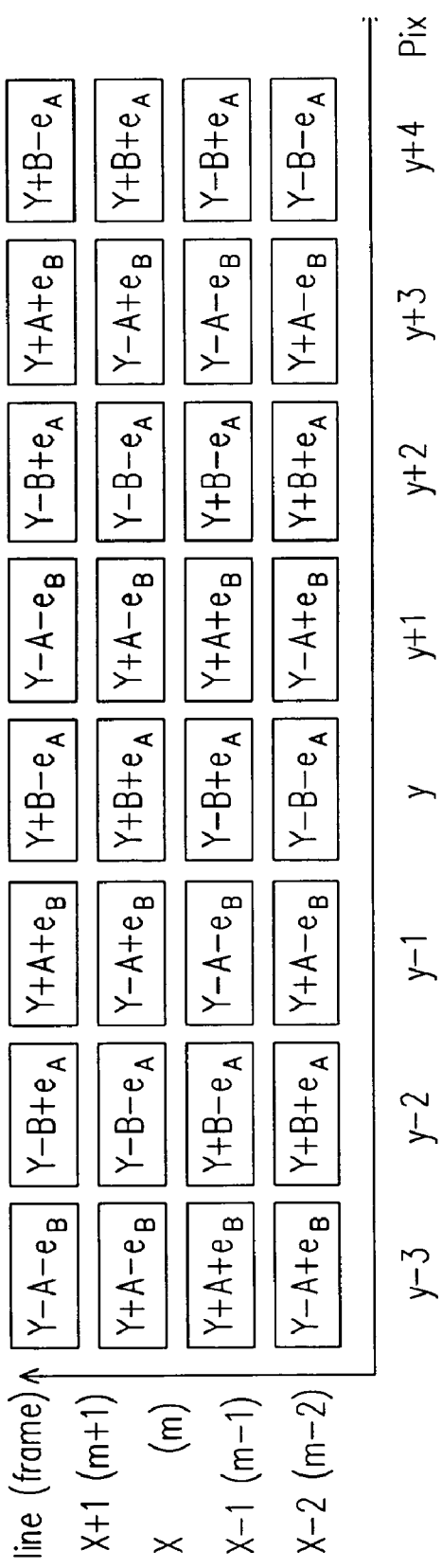
FIG. 2C is a schematic diagram illustrating the physical sampling result (partial) for the frames in the PAL system when the sample phase is equal to $0.25\pi+\delta$, $0.75\pi+\delta$, $1.25\pi+\delta$, and $1.75\pi+\delta$, respectively.
Figure 3A:
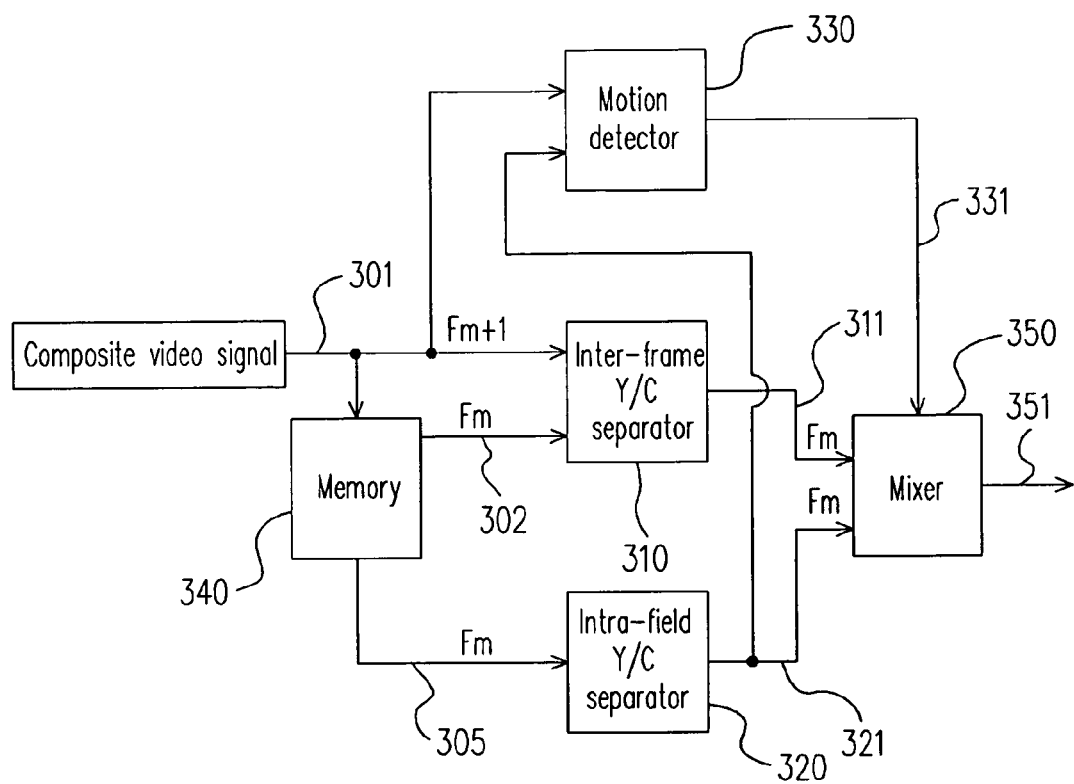
FIG. 3A is a schematic block diagram of a conventional 3D comb filter.
Figure 3B:
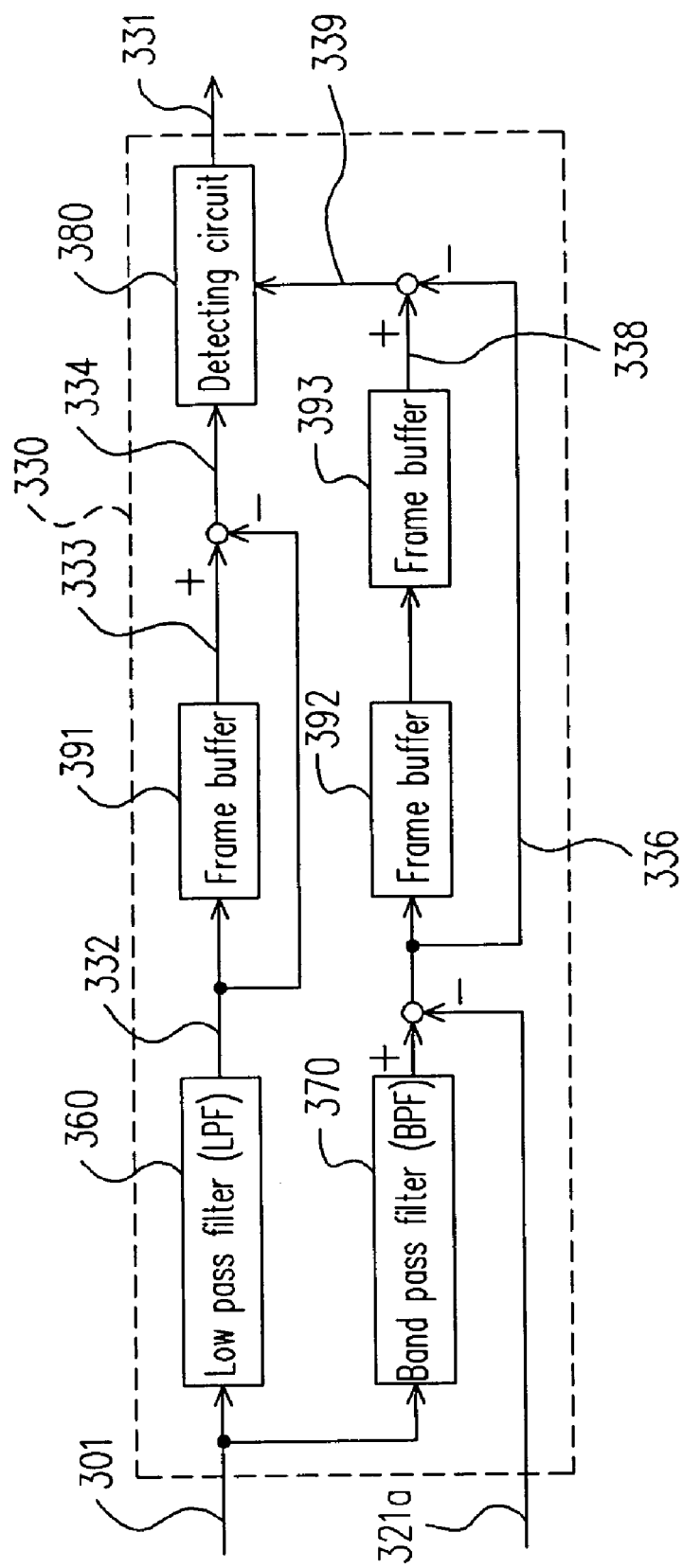
FIG. 3B is a schematic block diagram of a motion detector of a conventional 3D comb filter.

In addition, the PAL system in FIG. 2C (where the Y-axis represents the frames, and the X-axis represents the pixels) is exemplified herein for explanation. Some pixels are used for comparing with the $(m+1, m)^{th}$ frames and the $(m-1, m-2)^{th}$ frames, and some pixels are used for comparing with the $(m, m-1)^{th}$ frames and the $(m+1, m-2)^{th}$ frames. The idea is to compare the pixels having the same attribute. Wherein, the smaller the difference, the more still the pixel, and the difference after the comparison is the intermediate difference $IMD_{x,y}$ (step S405). However, since a phase difference exists, even when it is a still picture, it is very hard for $IMD_{x,y}$ to obtain a result approaching to 0 (i.e. obtaining a two times phase difference). Therefore, the PAL signal needs some special process. In FIG. 2C, a summation of the $m^{th}$ frame and the $(m-2)^{th}$ frame is a value used to totally eliminate the chroma and the phase difference so as to obtain a two times luma, and the same as the summation of the $(m+1)^{th}$ frame and the $(m-1)^{th}$ frame. The luma difference $LD_{x,y}$ is obtained by taking an absolute value of a value of subtracting one luma value from the other luma value (step S404). Since the luma difference is calculated to precisely eliminate the phase difference, if the input signal is a real still signal, the luma difference should be approaching to 0. Therefore, in calculating PAL's $MD_{x,y}$, $IMD_{x,y}$ and $LD_{x,y}$ have to be mixed up with an appropriate ratio, so as to obtain a final $MD_{x,y}$ (step S406).

However, since the attribute each sample point is not the same, only using the max difference $MD_{x,y}$ of each pixel as the motion factor is not appropriate. For example, if each pixel of the $(m+1)^{th}$ frame is red, and each pixel of all other frames are white. The luma Y of white color is much higher than the luma Y of red color, the chroma V of red color is much higher than the chroma V of white color, and even chroma U of both colors have a little difference, and the difference is small. Therefore, when Y+V of the white color is compared with Y+V of the red color, the difference is small. However, when Y−V of the white color is compared with Y−V of the red color, its difference is very big. When comparing Y+U with Y−U, different differences are obtained. In other words, even when color A is compared with color B with the same method, different differences are obtained if the items being compared are not the same. If the motion factor of each pixel is determined by each pixel itself, the motion factor exhibits a sine wave. Therefore, it is required to use 4 pixels as a group to determine the final motion factor (both in NTSC and PAL).

Therefore, after the max difference $MD_{x,y}$ for each pixel is calculated, an average is obtained by averaging 4 max differences (which comprises the max difference of the target pixel) of the contiguous pixels selected, and the motion factor is obtained by selecting a minimum from the averages of max difference. It is represented as following equations: $AMD_{x,h}=(MD_{x,h}+MD_{x,h+1}+MD_{x,h+2}+MD_{x,h+3})/4$; $MF_{x,y}=Min(AMD_{x,y}, AMD_{x,y-1}, AMD_{x,y-2}, AMD_{x,y-3})$. Wherein, $AMD_{x,h}$ represents an average of max difference of the $h^{th}$ pixel on the $x^{th}$ line, and $MF_{x,y}$ represents a motion factor of the $y^{th}$ pixel on the $x^{th}$ line. In the present embodiment, only the left average of max difference $AMDL_{x,y}$ (i.e. $AMD_{x,y-3}$) and the right average of max difference $AMDR_{x,y}$ (i.e. $AMD_{x,y}$) are used as an example for explanation. $AMDL_{x,y}$ (step S407) and $AMDR_{x,y}$ (step S408) are calculated, respectively. Then, a minimum of $AMDL_{x,y}$ and $AMDR_{x,y}$ is selected as the motion factor (step S409). It is represented as following equation: $MF_{x,y}=Min(AMDL_{x,y}, AMDR_{x,y})$.

The reason for selecting the minimum is because the pixel $P_{x,y}$ (which represents the $y_{th}$ pixel on the $x_{th}$ line) may locate on an edge of the motion object and the still object, and the motion factor of the pixel $P_{x,y}$ is also impacted by is 7 neighboring pixels. If the pixel $P_{x,y}$ belongs to a still object, certainly it is not expected to be impacted by the neighboring pixels and falsely determined as in the motion status. Therefore, the right approach is to select a minimum from each of the averages of max difference.

Before determining the motion/still status of the composite video signal, a threshold has to be provided first (step S410). The motion factor is then compared with the predetermined threshold (step S411). If the motion factor is obviously greater than the threshold, it is determined that the pixel is in the motion status (step S412). If the motion factor is obviously smaller than the threshold, it is determined that the pixel is in the still status (step S413).

Figure 5:
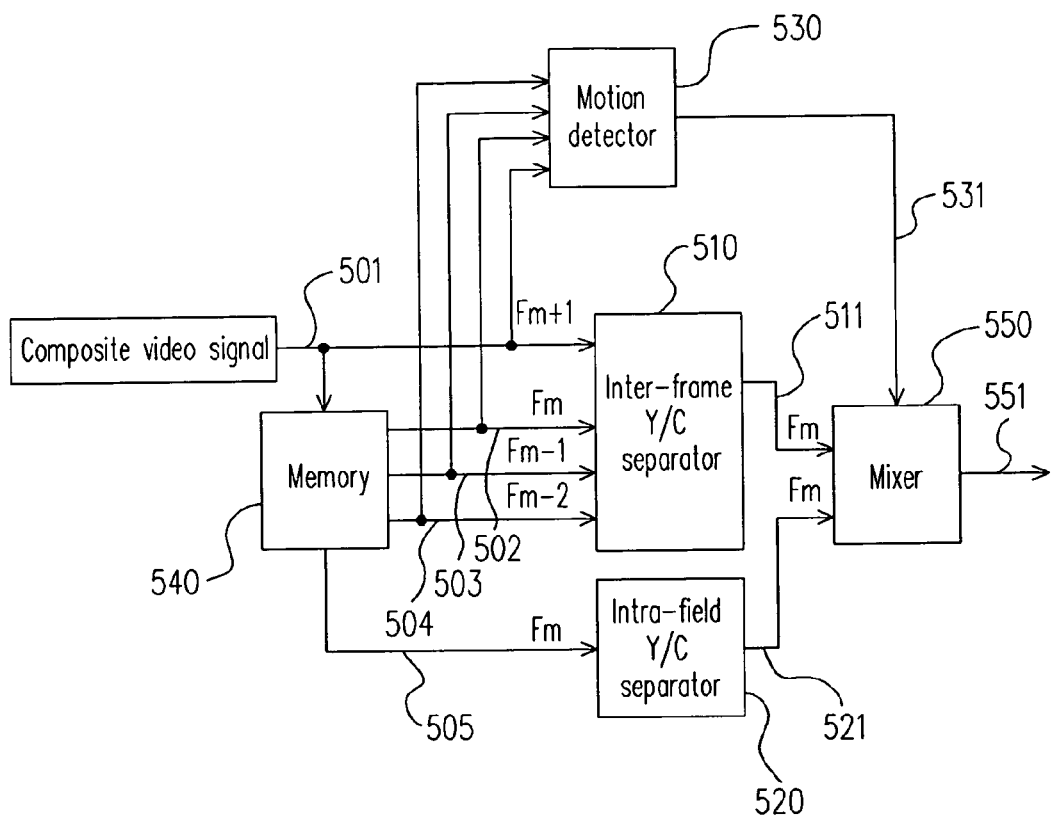
FIG. 5 is an application system block diagram illustrating a method of motion detection for a 3D comb filter video decoder according to an embodiment of the present invention.

In summary, a system block diagram according to an embodiment of the present invention is exemplified herein for describing the application of the present invention. FIG. 5 is an application system block diagram illustrating a method of motion detection for a 3D comb filter video decoder according to an embodiment of the present invention. Referring to FIG. 5, the application example of the 3D comb filter of the present invention comprises an inter-frame Y/C separator 510, an intra-field Y/C separator (i.e. the so-called 2D comb filter) 520, a motion detector 530, a memory 540, and a mixer 550. Wherein, the motion detector 530 performs the functions of the present invention. The composite video signal 501 is a composite video signal which has been sampled, and $F_{m+1}$ indicates that the composite video signal 501 is a composite video signal of the $(m+1)^{th}$ frame. The memory 540 temporarily stores the composite video signal 501, and provides a composite video signal 502 (of the $m^{th}$ frame $F_m$), a composite video signal 503 (of the $(m-1)^{th}$ frame $F_{m-1}$), and a composite video signal 504 (of the $(m-2)^{th}$ frame $F_{m-2}$). The memory 540 further provides a composite video signal 505 (of the $m^{th}$ frame $F_m$). The intra-field Y/C separator 520 receives the composite video signal 505 and performs the Y/C separation according to the space correlation among the pixels in the frame $F_m$, and finally outputs a separated video signal 521.

The Y/C separation of the motion video signal is performed by the intra-field Y/C separator 520. In order to improve the picture quality, the still video signal is processed by the inter-frame Y/C separator 510. The inter-frame Y/C separator 510 receives the sampled data of the frame $F_{m+1}$, $F_m$, $F_{m-1}$, and $F_{m-2}$ in the composite video signal simultaneously, and performs the Y/C separation according to the time correlation among the pixels each corresponding to the contiguous frame, respectively, so as to output a separated video signal 511. The motion detector 530 is responsible for determining whether the composite video signal 501 is a motion video signal or a still video signal. The motion detector 530 receives the sampled data of the frame $F_{m+1}$, $F_m$, $F_{m-1}$, and $F_{m-2}$ in the composite video signal, and uses them to determine whether the pixel is in motion or still status and outputs a selection signal 531. The method for determining has been described above, thus it is omitted herein. The mixer 550 selects the separated video signal 521 or the separated video signal 511, or mixed them up with a predetermined ratio according to the selection signal 531, and outputs a separated video signal 551.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A method of motion detection for a 3D comb filter video decoder, comprising:
   sampling a composite video signal for obtaining a plurality of temporarily stored sampled data $F_m P_{x,y}$, wherein $F_m P_{x,y}$ represents a sampled data of a $y^{th}$ pixel on an $x^{th}$ line of an $m^{th}$ frame in the composite video signal, and m, x, y are positive integers greater than or equal to 0, wherein the composite video signal is a signal for a PAL system, a frequency which is 4 times the subcarrier frequency in the composite video signal is used to sample the composite video signal, and the composite video signal is sampled when the subcarrier phase is equal to $0.25\pi$, $0.75\pi$, $1.25\pi$, and $1.75\pi$; and
   using $F_{m+1}P_{x,y}$, $F_m P_{x,y}$, $F_{m-1}P_{x,y}$, and $F_{m-2}P_{x,y}$ to determine a motion/still status of the composite video signal, comprising:
      using $F_{m+1}P_{x,y}$, $F_m P_{x,y}$, $F_{m-1}P_{x,y}$, and $F_{m-2}P_{x,y}$ to calculate and obtain a plurality of max differences $MD_{x,y}$, wherein $MD_{x,y}$ represents a max difference of the $y^{th}$ pixel on the $x^{th}$ line;
      averaging 4 max differences of the contiguous pixels selected to obtain a motion factor $MF_{x,y}$, wherein $MF_{x,y}$ represents a motion factor of the $y^{th}$ pixel on the $x^{th}$ line; and
      detecting $MF_{x,y}$ to determine the motion/still status of the $y^{th}$ pixel on the $x^{th}$ line in the composite video signal,
   wherein the step of calculating and obtaining $MD_{x,y}$ further comprises:
   calculating and obtaining a plurality of luma differences $LD_{x,y}$, wherein $LD_{x,y}$ represents a luma difference of the $y^{th}$ pixel on the $x^{th}$ line, and is calculated based on an equation:

$$LD_{x,y}=|F_m P_{x,y}+F_{m-2}P_{x,y}-F_{m+1}P_{x,y}-F_{m-1}P_{x,y}|;$$

calculating and obtaining a plurality of intermediate differences $IMD_{x,y}$, wherein $IMD_{x,y}$ represents an intermediate difference of the $y^{th}$ pixel on the $x^{th}$ line, and is calculated based on an equation:

$$IMD_{i,2j-1}=\text{Max}\{|F_{m+1}P_{i,2j-1}-F_{m-2}P_{i,2j-1}|, |F_m P_{i,2j-1}-F_{m-1}P_{i,2j-1}|\}; IMD_{i,2j}=\text{Max}\{|F_{m+1}P_{i,2j}-F_m P_{i,2j}|, |F_{m-1}P_{i,2j}-F_{m-2}P_{i,2j}|\}; \text{ and}$$

calculating and obtaining $MD_{x,y}$, which is calculated based on an equation:

$$MD_{x,y}=a*IMD_{x,y}+(1-a)*LD_{x,y};$$

wherein, a is a real number greater than 0 and less than 1, and i, j are positive integers.

2. A method of motion detection for a 3D comb filter video decoder, comprising:
   sampling a composite video signal for obtaining a plurality of temporarily stored sampled data $F_m P_{x,y}$, wherein $F_m P_{x,y}$ represents a sampled data of a $y^{th}$ pixel on an $x^{th}$ line of an $m^{th}$ frame in the composite video signal, and m, x, y are positive integers greater than or equal to 0; and
   using $F_{m+1}P_{x,y}$, $F_m P_{x,y}$, $F_{m-1}P_{x,y}$, and $F_{m-2}P_{x,y}$ to determine a motion/still status of the composite video signal, comprising:
      using $F_{m+1}P_{x,y}$, $F_m P_{x,y}$, $F_{m-1}P_{x,y}$, and $F_{m-2}P_{x,y}$ to calculate and obtain a plurality of max differences $MD_{x,y}$, wherein $MD_{x,y}$ represents a max difference of the $y^{th}$ pixel on the $x^{th}$ line;
      averaging 4 max differences of the contiguous pixels selected to obtain a motion factor $MF_{x,y}$, wherein $MF_{x,y}$ represents a motion factor of the $y^{th}$ pixel on the $x^{th}$ line; and
      detecting $MF_{x,y}$ to determine the motion/still status of the $y^{th}$ pixel on the $x^{th}$ line in the composite video signal,
   wherein the step of obtaining $MF_{x,y}$ further comprises:
      averaging 4 max differences of the contiguous pixels selected to obtain a plurality of max differences $AMD_{x,h}$, wherein $AMD_{x,h}$ represents an average of max difference of a $h^{th}$ pixel on the $x^{th}$ line, h is a positive integer, and $AMD_{x,h}$ is calculated based on an equation:

$$AMD_{x,h}=(MD_{x,h}+MD_{x,h+1}+MD_{x,h+2}+MD_{x,h+3})/4; \text{ and}$$

selecting a minimum from the averages of max difference to obtain a motion factor $MF_{x,y}$, wherein $MF_{x,y}$ represents a motion factor of the $y^{th}$ pixel on the $x^{th}$ line,
   wherein the step of selecting a minimum from the averages of max difference to obtain $MF_{x,y}$ is based on an equation:

$$MF_{x,y}=\text{Min}(AMD_{x,y}, AMD_{x,y-1}, AMD_{x,y-2}, AMD_{x,y-3}),$$
   and wherein the step of selecting a minimum from the averages of max difference to obtain $MF_{x,y}$ is based on an equation:

$$MF_{x,y}=\text{Min}(AMD_{x,y}, AMD_{x,y-3}).$$

3. A method of motion detection for a 3D comb filter video decoder, comprising:
   sampling a composite video signal to obtain a sampled data $F_{m+1}P_{x,y}$, wherein $F_{m+1}P_{x,y}$ represents a sampled data of a $y^{th}$ pixel on an $x^{th}$ line of an $(m+1)^{th}$ frame in the composite video signal, and m, x, y are positive integers greater than or equal to 0, wherein the composite video signal is a signal for an NTSC system, and sampling the composite video signal uses a frequency which is 4 times the subcarrier frequency in the composite video signal to sample; and
   obtaining three stored sampled data $F_m P_{x,y}$, $F_{m-1}P_{x,y}$, $F_{m-2}P_{x,y}$, previously sequentially sampled directly from the composite video signal and stored in a storing means, wherein the sampled data $F_{m+1}P_{x,y}$ and the three previously sequentially sampled data $F_m P_{x,y}$, $F_{m-1}P_{x,y}$, $F_{m-2}P_{x,y}$ are obtained by directly sampling the composite video signal when the subcarrier phase is equal to 0, $0.5\pi$, $\pi$, and $1.5\pi$, sequentially;

using the sampled data $F_{m+1}P_{x,y}$ and the three stored sampled data $F_mP_{x,y}$, $F_{m-1}P_{x,y}$, $F_{m-2}P_{x,y}$ to determine a motion/still status of the composite video signal, comprising:

using $F_{m+1}P_{x,y}$, $F_mP_{x,y}$, $F_{m-1}P_{x,y}$, and $F_{m-2}P_{x,y}$ to calculate and obtain a plurality of max differences $MD_{x,y}$, wherein $MD_{x,y}$ represents a max difference of the $y^{th}$ pixel on the $x^{th}$ line;

averaging 4 max differences of the contiguous pixels selected to obtain a motion factor $MF_{x,y}$, wherein $MF_{x,y}$ represents a motion factor of the $y^{th}$ pixel on the $x^{th}$ line; and detecting $MF_{x,y}$ to determine the motion/still status of the $y^{th}$ pixel on the $x^{th}$ line in the composite video signal.

4. The method of motion detection for a 3D comb filter video decoder of claim 3, wherein $MD_{x,y}$ is calculated based on an equation:

$$MD_{x,y}=\text{Max}\{|F_mP_{x,y}-F_{m-2}P_{x,y}|, |F_{m+1}P_{x,y}-F_{m-1}P_{x,y}|\}.$$

5. The method of motion detection for a 3D comb filter video decoder of claim 3, wherein the step of detecting $MF_{x,y}$ to determine the motion/still status of the $y^{th}$ pixel on the $x^{th}$ line in the composite video signal further comprises:

providing a threshold; and comparing $MF_{x,y}$ with the threshold, and when $MF_{x,y}$ is greater than the threshold, it is determined that the $y^{th}$ pixel on the $x^{th}$ line in the composite video signal is in the motion status, otherwise, the $y^{th}$ pixel on the $x^{th}$ line in the composite video signal is in the still status.

6. The method of motion detection for a 3D comb filter video decoder of claim 5, wherein the motion factors $MF_{x,y}$ are the motion factors of the $m^{th}$ frame.

7. A method of motion detection for a 3D comb filter video decoder, comprising:

sampling a composite video signal to obtain a sampled data $F_{m+1}P_{x,y}$, wherein $F_{m+1}P_{x,y}$ represents a sampled data of a $y^{th}$ pixel on an $x^{th}$ line of an $(m+1)^{th}$ frame in the composite video signal, and m, x, y are positive integers greater than or equal to 0, wherein the composite video signal is a signal for a PAL system, and sampling the composite video signal uses a frequency which is 4 times the subcarrier frequency in the composite video signal to sample; and obtaining three stored sampled data $F_mP_{x,y}$, $F_{m-1}P_{x,y}$, $F_{m-2}P_{x,y}$, previously sequentially sampled directly from the composite video signal and stored in a storing means, wherein the sampled data $F_{m+1}P_{x,y}$ and the three previously sequentially sampled data $F_mP_{x,y}$, $F_{m-1}P_{x,y}$, $F_{m-2}P_{x,y}$ are obtained by directly sampling the composite video signal when the subcarrier phase is equal to $0.25\pi$, $0.75\pi$, $1.25\pi$, and $1.75\pi$, sequentially;

using the sampled data $F_{m+1}P_{x,y}$ and the three stored sampled data $F_mP_{x,y}$, $F_{m-1}P_{x,y}$, $F_{m-2}P_{x,y}$ to determine a motion/still status of the composite video signal, comprising:

using $F_{m+1}P_{x,y}$, $F_mP_{x,y}$, $F_{m-1}P_{x,y}$, and $F_{m-2}P_{x,y}$ to calculate and obtain a plurality of max differences $MD_{x,y}$, wherein $MD_{x,y}$ represents a max difference of the $y^{th}$ pixel on the $x^{th}$ line;

averaging 4 max differences of the contiguous pixels selected to obtain a motion factor $MF_{x,y}$, wherein $MF_{x,y}$ represents a motion factor of the $y^{th}$ pixel on the $x^{th}$ line; and detecting $MF_{x,y}$ to determine the motion/still status of the $y^{th}$ pixel on the $x^{th}$ line in the composite video signal.

8. The method of motion detection for a 3D comb filter video decoder of claim 7, wherein the step of calculating and obtaining $MD_{x,y}$ further comprises:

calculating and obtaining a plurality of luma differences $LD_{x,y}$, wherein $LD_{x,y}$ represents a luma difference of the $y^{th}$ pixel on the $x^{th}$ line, and is calculated based on an equation:

$$LD_{x,y}=|F_mP_{x,y}+F_{m-2}P_{x,y}-F_{m+1}P_{x,y}-F_{m-1}P_{x,y}|;$$

calculating and obtaining a plurality of intermediate differences $IMD_{x,y}$, wherein $IMD_{x,y}$ represents an intermediate difference of the $y^{th}$ pixel on the $x^{th}$ line, and is calculated based on an equation:

$$IMD_{i,2j-1}=\text{Max}\{|F_{m+1}P_{i,2j-1}-F_{m-2}P_{i,2j-1}|, |F_mP_{i,2j-1}-F_{m-1}P_{i,2j-1}|\}; IMD_{i,2j}=\text{Max}\{|F_{m+1}P_{i,2j}-F_mP_{i,2j}|, |F_{m-1}P_{i,2j}-F_{m-2}P_{i,2j}|\}; \text{ and}$$

calculating and obtaining $MD_{x,y}$, which is calculated based on an equation:

$$MD_{x,y}=a*IMD_{x,y}+(1-a)*LD_{x,y};$$

wherein, a is a real number greater than 0 and less than 1, and i, j are positive integers.

9. The method of motion detection for a 3D comb filter video decoder of claim 7, wherein the step of detecting $MF_{x,y}$ to determine the motion/still status of the $y^{th}$ pixel on the $x^{th}$ line in the composite video signal further comprises:

providing a threshold; and comparing $MF_{x,y}$ with the threshold, and when $MF_{x,y}$ is greater than the threshold, it is determined that the $y^{th}$ pixel on the $x^{th}$ line in the composite video signal is in the motion status, otherwise, the $y^{th}$ pixel on the $x^{th}$ line in the composite video signal is in the still status.

10. The method of motion detection for a 3D comb filter video decoder of claim 9, wherein the motion factors $MF_{x,y}$ are the motion factors of the $m^{th}$ frame.

* * * * *